United States Patent [19]
Griffin et al.

[11] Patent Number: 5,406,403
[45] Date of Patent: Apr. 11, 1995

[54] TRANSMITTER AND RECEIVER FOR DATA LINK SYSTEM

[75] Inventors: Michael E. Griffin, Maplewood; Christopher R. Yungers, Saint Paul, both of Minn.

[73] Assignee: Minnesota Mining and Manufacturing Company, Saint Paul, Minn.

[21] Appl. No.: 944,810

[22] Filed: Sep. 14, 1992

Related U.S. Application Data

[63] Continuation of Ser. No. 326,285, Mar. 21, 1989, abandoned.

[51] Int. Cl.$^6$ ............................................. H04J 14/08
[52] U.S. Cl. ................................... 359/135; 359/180; 370/110.1
[58] Field of Search ............... 359/135, 136, 137, 118, 359/110, 155, 177, 180, 189; 370/110.1, 94.1, 60

[56] References Cited

U.S. PATENT DOCUMENTS

| | | | |
|---|---|---|---|
| 4,009,343 | 2/1977 | Markey et al. | 370/95.3 |
| 4,228,424 | 10/1980 | Le Nay et al. | 340/506 |
| 4,236,245 | 11/1980 | Freeny et al. | 370/82 |
| 4,333,176 | 6/1982 | Looschen | 370/4 |
| 4,367,548 | 1/1983 | Cotten, Jr. et al. | 370/3 |
| 4,477,898 | 10/1984 | Cholat Namy | 370/84 |
| 4,675,861 | 6/1987 | Ottermark | 370/4 |
| 4,692,918 | 9/1987 | Elliott et al. | 370/85.11 |

FOREIGN PATENT DOCUMENTS

0214915A2  3/1987  European Pat. Off. .... H04M 11/00

OTHER PUBLICATIONS

Microprocessors and Microsystems, vol. 12, No. 1, Jan.–Feb. 1988, pp. 3-12, London, GB; D. Bracknell: "Introduction to the MIL-Std-1553B serial multiplex data bus."

Primary Examiner—Richard E. Chilcot, Jr.
Assistant Examiner—K. Negash
Attorney, Agent, or Firm—Gary L. Griswold; Walter N. Kirn; Stephen W. Buckingham

[57] ABSTRACT

A transmitter for a data communication system includes a self configuration register for storing information about the configuration of a local data communication port and a data input register for storing data received from the port to be transmitted and a multiplexer for multiplexing information stored in the self configuration register into configuration data packets and information stored in the data input register into message data packets and transmitting those data packets over an optical fiber. A receiver for a data communication system includes a demultiplexer, an-other configuration register and an output register. The demultiplexer receives data, demultiplexes it and stores it in the output register. The output register transmits information in configuration data packets to the other configuration register and information in message data packets to the local data port.

3 Claims, 1 Drawing Sheet

TRANSMITTER AND RECEIVER FOR DATA LINK SYSTEM

This is a continuation of application No. 07/326,285, filed Mar. 21, 1989, now abandoned.

BACKGROUND OF THE INVENTION

Many standards exist for both serial and parallel data communications. Such standards control both the software that determines how data will be interpreted and the hardware of the communication ports themselves. A problem exists, however, in that within the hardware standards there is possible room for variation. Therefore, it is necessary when connecting two communication ports to ensure that the cabling connects the proper lines of each communication port to one another. Service personnel will usually have a number of cables with different connections available for this purpose.

In some situations it is desirable to use optical fiber rather than electrical wiring in data communications. This is true because optical fiber connections are not subject to the limitations on distance due to capacitance as are electrical connections and can operate in electrically noisy environments without undergoing the severe data degradation that often occurs when electrical wiring is used in such environments.

When optical fiber is used, typically the signals on several lines carrying information are transmitted sequentially over a single optical fiber. The receiver will then assign each of the values sent to the appropriate one of the lines on the communications port associated with the receiver. As with the situation described above for electrical connections, the transmitter and receiver must both be properly configured so that the various signals actually do get to the correct lines of the receiving communication port. This may be accomplished by designing separate transmitters and receivers for each possible configuration. Because within a typical protocol there may be as many as 20 or more possible configurations, this alternative requires the maintenance of a large stock of transmitters and receivers and care in correctly matching the proper transmitter and receiver in a particular communication link.

Alternatively the transmitters and receivers may be made programmable so that each one can assume each of the various possible configurations. It is then the responsibility of the installer to ensure that the transmitters and receivers are properly programmed for use with the ports to which they are attached.

SUMMARY OF THE INVENTION

According to one aspect of the present invention a transmitter is provided. The transmitter includes a self-configuration register for storing information about the configuration of the associated communication port, an input register for storing data received from the communication port, and a multiplexer for multiplexing the configuration information into a configuration data packet and transmitting the configuration data packet over an optical fiber and for multiplexing information stored in the input register into a message data packet and transmitting the message data packet over the optical fiber. The configuration data packet comprises a start bit, a data identification bit and a plurality of data bits, where the data identification bit has a first digital value. The message data packets comprise a start bit, a data identification bit and a data bit, where the data identification bit has a second digital value and the first and second digital values are different.

In another aspect of the invention a receiver includes a demultiplexer for receiving data packets and demultiplexing them, an other configuration register and an output register. The demultiplexer sending information received to the output register and the output register sending data from configuration data packets to the other configuration register and data from message data packets to the associated communication port.

DETAILED DESCRIPTION OF THE PREFERRED EMBODIMENT

The present invention is used in conjunction with circuitry for detecting the configuration of a communication port and properly configuring the transmitter and receiver to work therewith. Such systems are described in copending patent applications Ser. No. 326,282, filed Mar. 21, 1989, now abandoned, and Ser. No. 326,284, filed Mar. 21, 1989. In those systems the transmitter and receiver must be able to communicate with each other to ensure that they are properly configured to work together as well as to transmit data between the associated communication ports. The receiver must, therefore, be able to differentiate between the signals sent for configuration purposes and the signals that are to be transmitted on to the communication port.

The present invention includes in each data packet a data identification bit that indicates to the receiver whether the data packet is indicative of configuration information or contains transmitted data to be relayed onto the communication port associated with the receiver. If the information is configuration information the receiver stores the information in a configuration register and then compares the information in that configuration register with its own configuration to determine whether a valid connection can be obtained.

The present invention will be described in terms of separate transmitters and receivers. In a typical implementation, each communication port would have connected to it a transceiver having both a transmitter and a receiver.

The present invention will futher be described in terms of a data communication system comprising a local communication port and a distant communication port. Each of the ports is capable of transmitting and receiving information on a plurality of parallel information channels. It will be understood, however, that the communication ports need not be parallel ports in the traditional sense of that term. For the purposes hereof, communication ports capable of transmitting and receiving parallel information will also include traditional serial communication ports where two parallel channels are used to transmit data, one for each direction of transmission or where data is transmitted on one or more channels parallel to control signals on other channels.

Figure 1:
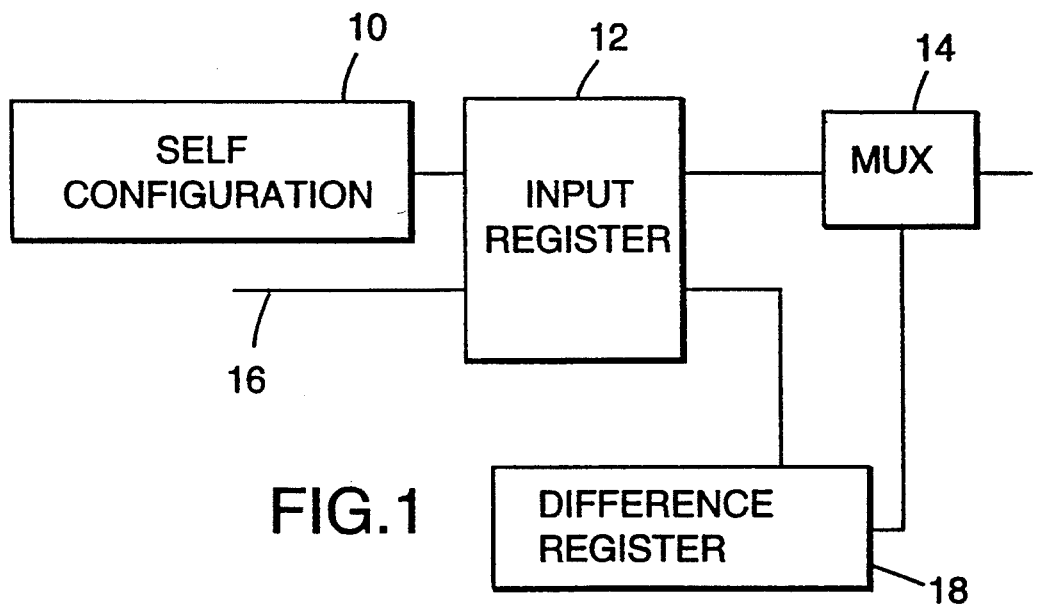
FIG. 1 is a block diagram of a transmitter acccording to the invention.

FIG. 1 shows a transmitter according to the invention. The transmitter of FIG. 1 includes a self-configuration register 10. Before any data is transmitted, self-configuration register 10 will have stored therein information describing the configuration of the communication port. This information may have been determined by automatic configuration circuitry or may have been programmed by a user. The information in self-configuration register 10 may be directly descriptive of the configuration, such as by providing one bit for each line in the communication port. In that situation, each bit would have a value indicative of whether the particular line with which it is associated is an input or an output.

Alternatively, a system of codes could be used. This is useful when not all possible configurations of a port are valid according to the standards for the type of port. This reduces the number of bits that must be stored and must be transmitted to the receiver. For example, in a preferred embodiment for use with RS232 communication ports the signals on 9 of the 25 lines are transmitted over the data channel. While the 9 lines could be configured as inputs or outputs in 512 ways, only 22 of those are possible if the RS232 standard is followed. Therefore, only 5 bits need be stored and transmitted to indicate the configuration rather than 9.

In order to insure that the transmitter and receiver are properly configured for communication with one another, the contents of self-configuration register 10 are transmitted to input register 12. Input register 12 retransmits those contents to multiplexer 14. Multiplexer 14 converts the parallel data received from input register 12 into serial data, converts it into an optical signal, and transmits it over optical fiber 14.

Specifically multiplexer 14 first transmits one or more start bits. Preferably only one start bit is transmitted. After the start bit, a data identification bit is transmitted. This bit will have a preselected value indicative of the fact that the data packet contains configuration information rather than data to be transmitted to the communication port. For example, a value of 1 for the data identification bit may be preselected to indicate that the packet contains configuration information. The multiplexer then sequentially transmits the configuration bits. The data packet thus transmitted can be called a configuration data packet.

If a valid configuration is determined to exist the transmitter shifts into normal transmit mode. Data from the communication port to which the transmitter is attached enters input register 12 through bus 16. This information is sent to multiplexer 14 which transmits a start bit followed by a data identification bit. The data identification bit will have the opposite value from the one sent as a part of the data packet containing configuration information. Thus if the configuration data packet used a data identification bit equal to 1, the data packets containing data to be transmitted to the communication port to which the receiver is attached will have a value of zero. The multiplexer then transmits the values of the bits received from input register 12. The data packet thus transmitted contains a message to be transmitted from one data port to another and so may be called a message data packet.

The value received by input register 12 is also transmitted to difference register 18 and stored therein. Input register 12 then continues to send its contents to difference register 18. Difference register 18 monitors the values it receives from input register 12 until it detects that a change has occurred. This may be done, for example, by performing an EXCLUSIVE-OR operation on each bit in difference register 18 and the corresponding bit of input register 12. When difference register 18 detects a change in the information stored in input register 12 it signals multiplexer 14 of that fact and multiplexer 14 transmits a data packet in the same manner as previously described. The data packet always contains a bit representative of the values of all of the lines of the communication port to which the transistor is connected that are active in the current configuration.

Figure 2:
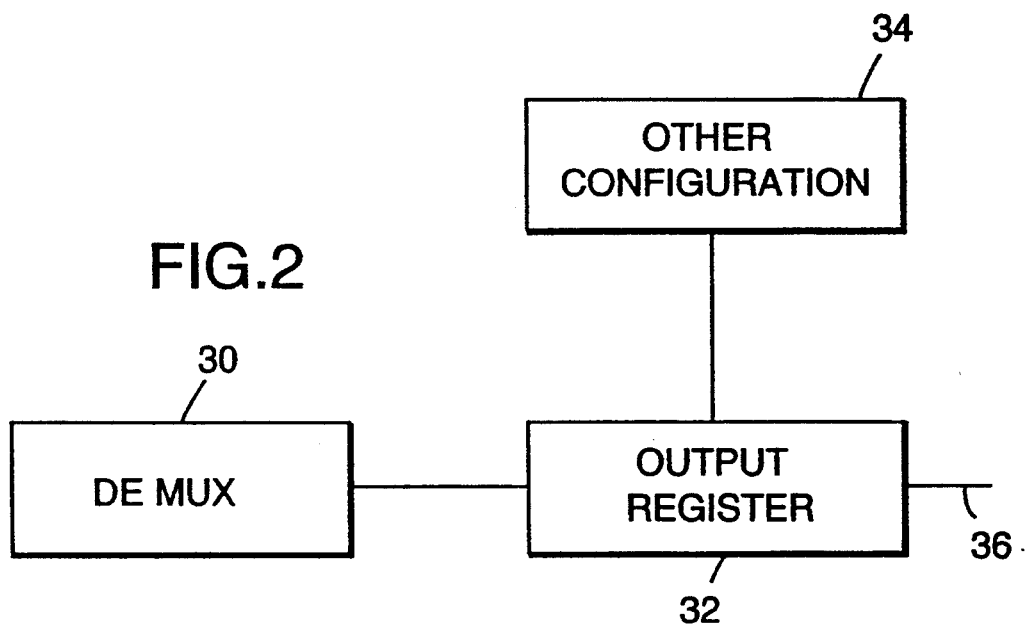
FIG. 2 is a block diagram of a receiver according to the invention.
Figure 3:
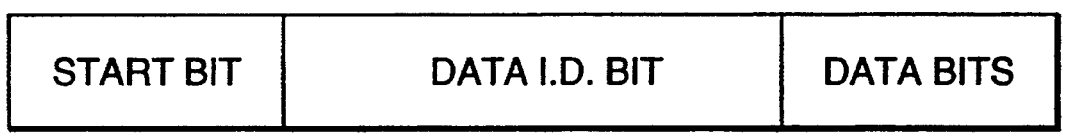
FIG. 3 is a data format for the claimed invention.

FIG. 2 illustrates a receiver according to the invention. In the receiver of FIG. 2, demultiplexer 30 receives the signal from the transmitter of FIG. 1. Demultiplexer 30 then converts the optical signal to an electrical signal and rearranges the serial data into parallel data. Demultiplexer 30 then sends the parallel data to output register 32.

Output register 32 checks the data identification bit to determine whether the data packet is a configuration data packet or a message data packet. If the data identification bit indicates that the packet is a configuration data packet the data is stored in other configuration register 34. If it is a message data packet the data is transmitted to the communication port to which the receiver is connected over bus 36.

As noted above, the transmitter of FIG. 1 only sends information to the receiver of FIG. 2 when that information has changed. Those skilled in the art will realize that during normal communications over an RS232 data channel, the control signals rarely change. Furthermore it is quite common that several consecutive data bits will be equal to one another. It would seem that under those circumstances only the first data bit is transmitted. While it is true that no transmission is sent by the transmitter of FIG. 1 they are effectively transmitted. This is because the port to which the receiver of FIG. 2 is connected will have been set for a particular bit rate. For example, if the port is set to receive data at 9600 bits per second it will sample the logic level of the data line an integral multiple of 9600 times each second. The value that is there will be interpreted as the value of the current bit. For purposes of the circuitry of the communication port, it is not important whether any signal has actually been transmitted from the transmitter of FIG. 1 to the receiver of FIG. 2. The advantage of only transmitting data from the transmitter to the receiver when the value of one of the bits changes is that it reduces the amount of power consumed by the transmitter. This is particularly important when the transmitter of FIG. 1 is part of a battery powered system.

A further improvement relates to the fact that some configurations may require fewer than the total possible number of data bits to be transmitted. For example, while the system may be capable of transmitting the values of 9 lines of an RS232 port, a particular configuration may require transmission of the values present on only 4 of those lines. Under these circumstances transmitter 14 may be configured to send the values present on only those 4 lines. Under those circumstances the receiver of FIG. 2 would be configured to expect to receive only the values on those 4 lines. This properly can be used to advantage to increase the data transmission rate. In the example given above the potential data transmission rate would be more than doubled.

It is important to note that while the number of data bits transmitted may run from 1 to the capacity of the system, in the example given 9, the number of bits in a data packet containing configuration information will be fixed. Thus if the configuration information is stored in a five bit format, all five bits must be sent in every data packet used to transmit configuration.

We claim:

1. A transmitter for use in a fiber optic data communication system, said transmitter being adapted to be connected to a communication port, said transmitter comprising:

self configuration register means for storing information about the configuration of said communication port;

input register means for storing data received from said communication port;

multiplexer means for multiplexing said configuration information into a configuration data packet and transmitting said configuration data packet over an optical fiber, said configuration data packet comprising a start bit, a data identification bit and a plurality of data bits, said data identification bit of said configuration data packet having a first digital value, said multiplexer means further being for multiplexing said data stored in said input register means into message data packets, said message data packets comprising a start bit, a data identification bit and a data bit, said data identification bit of said message data packets having a second digital value, said first and second digital values being different.

2. The transmitter of claim 1 further comprising a difference register means for monitoring data stored in said input register means and causing said multiplexer to transmit a message data packet only when said stored data changes.

3. A receiver for use in fiber optic data communication system, said receiver being adapted to be connected to a local communication port, said receiver comprising:

demultiplexer means for receiving data packets from a distant communication port and converting serial information contained therein to parallel form, said data packets comprising a start bit, a data identification bit and a data bit;

other configuration register means for storing information about the configuration of said distant communication port;

output register means for receiving and storing data from said demultiplexer and sending said data to said other configuration register if said data identification bit has a first digital value and sending said data to said local communication port if said data identification bit has a second digital value, said first and second digital values being different.

* * * * *